(12) United States Patent
Bourgeois et al.

(10) Patent No.: US 9,820,611 B2
(45) Date of Patent: Nov. 21, 2017

(54) GRILLING RACK

(71) Applicant: METAL FUSION, INC., Jefferson, LA (US)

(72) Inventors: Norman R. Bourgeois, Jefferson, LA (US); Barbara Bourgeois, Jefferson, LA (US); Michael P. Bourgeois, Kenner, LA (US)

(73) Assignee: Metal Fusion, Inc., Jefferson, LA (US)

( * ) Notice: Subject to any disclaimer, the term of this patent is extended or adjusted under 35 U.S.C. 154(b) by 238 days.

(21) Appl. No.: 14/585,801

(22) Filed: Dec. 30, 2014

(65) Prior Publication Data

US 2015/0182073 A1 Jul. 2, 2015

Related U.S. Application Data

(63) Continuation of application No. 13/151,800, filed on Jun. 2, 2011, now Pat. No. 8,919,244.

(60) Provisional application No. 61/350,826, filed on Jun. 2, 2010.

(51) Int. Cl.
*A22C 7/00* (2006.01)
*A47J 37/06* (2006.01)
*A47J 43/18* (2006.01)

(52) U.S. Cl.
CPC ........... *A47J 37/0694* (2013.01); *A47J 43/18* (2013.01)

(58) Field of Classification Search
CPC ............................. A47J 37/0694; A47J 43/18
USPC ......... 99/400, 401, 413, 425, 426, 427, 441, 99/444, 445, 446, 447, 448, 449, 450, 99/494, 440; 426/281
See application file for complete search history.

(56) References Cited

U.S. PATENT DOCUMENTS

| | | | |
|---|---|---|---|
| 5,860,358 A | 1/1999 | Shriver | |
| 5,983,786 A * | 11/1999 | Brown ................ | A47J 37/0786 99/400 |
| 6,260,478 B1 * | 7/2001 | Harneit ................ | A47J 37/067 99/400 |
| 7,281,469 B1 | 10/2007 | Barbour et al. | |
| 8,919,244 B1 | 12/2014 | Bourgeois et al. | |
| 2007/0125357 A1 * | 6/2007 | Johnston .............. | A47J 37/0694 126/41 R |
| 2008/0066734 A1 * | 3/2008 | Bright ................... | A47J 37/067 126/25 R |
| 2009/0308374 A1 * | 12/2009 | Ahmed ................. | A47J 37/067 126/25 R |

* cited by examiner

*Primary Examiner* — Dana Ross
*Assistant Examiner* — Joseph Iskra
(74) *Attorney, Agent, or Firm* — Brett A. North

(57) ABSTRACT

A food grilling rack provides a frame defined by a plurality of connected side walls forming a closed geometric shape. The frame includes a lower corrugated sheet that provides multiple troughs, each trough having a lowest portion. The lower sheet is attached to at least some of the side walls. An upper sheet of material is supported (e.g., removably) above the sheet of corrugated material. There are a plurality of openings in the upper sheet of material, each opening being vertically aligned with a lowest portion of a trough. In one embodiment, the frame includes a pair of flanged members attached to a lower corrugated sheet that provides multiple troughs, each trough having a lowest portion. A sheet with openings slides into the frame aligning the openings with the lowest part of the trough.

20 Claims, 4 Drawing Sheets ated with an inclined panel 25. While multiple troughs 21 are shown, a single trough 21 could be provided on an elongated lower section 12 having a single row of openings 19 in an upper section 13 (as an alternate embodiment).

GRILLING RACK

CROSS-REFERENCE TO RELATED APPLICATIONS

This is a continuation of U.S. patent application Ser. No. 13/151,800, filed Jun. 2, 2011 (issued as U.S. Pat. No. 8,919,244 on Dec. 30, 2014), which claims benefit of U.S. Provisional Patent Application Ser. No. 61/350,826, filed Jun. 2, 2010.

Priority of U.S. Provisional Patent Application Ser. No. 61/350,826, filed Jun. 2, 2010, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to food grilling racks that can be used to contain food and then be placed upon a cooking surface such as an outdoor grilling surface.

2. General Background of the Invention

Food items are often placed upon a perforated plate, which is then placed upon a barbecue pit, outdoor grill or other outdoor cooking surface. Such perforated plates are commercially available. At times, they are provided with handles for enabling a user to lift and move the plate before and after use. It is common and known to grill a number of different food items on such perforated grilling plates, such as onions, peppers, corn, and other food items.

Some food items such as jalapenos peppers or bell peppers can be stuffed with food items such as a breaded mixture of rice and meat or seafood. In such a case, users often cut the pepper transversely or longitudinally and fill each of the cut halves with a selected stuffing or filling.

One of the problems with the prior art grilling racks is that the food items can often fall in between the openings or become stuck in the openings.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
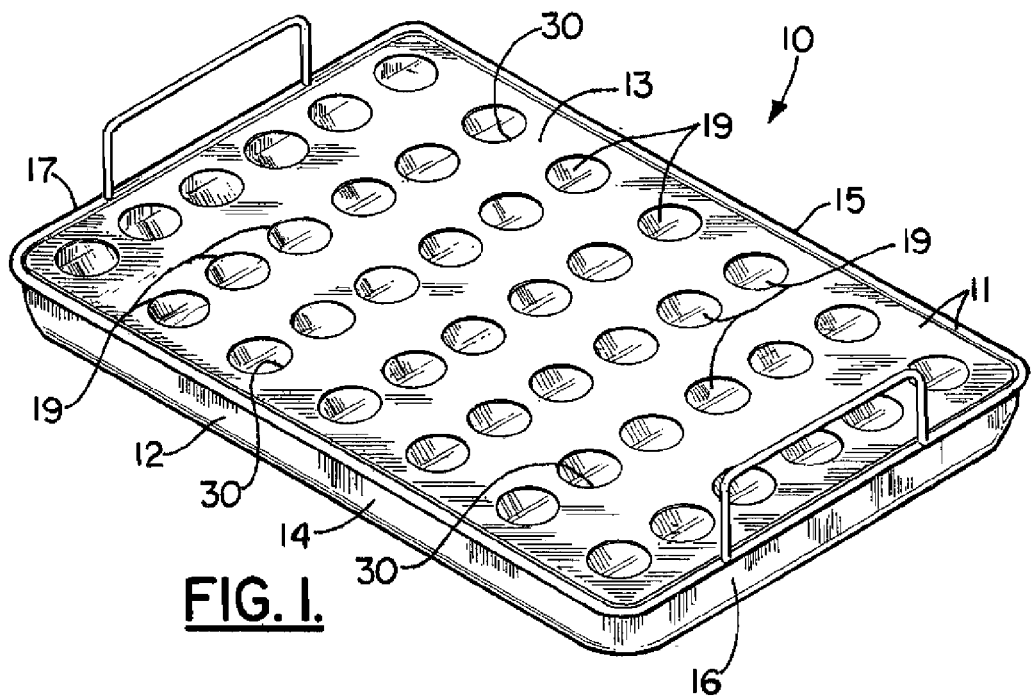
FIG. 1 is a perspective view of a preferred embodiment of the present invention.

FIGS. 1-4 show a preferred embodiment of the apparatus of the present invention designated generally by the numeral 10. Grilling rack 10 is in the form of a two part frame 11 which can be metallic (e.g., aluminum or stainless steel). Frame 11 has a lower section 12 and an upper section 13. Upper section 13 is a removable plate that can be perforated or apertured.

The upper section or plate 13 can be in the form of a perforated plate that can be removed from the lower section 12 by lifting the section 13 upwardly. Lower section 12 has a corrugated bottom panel 20 (see FIGS. 2-4) that has troughs 21 and peaks 22 (See FIG. 2). Bottom panel 20 can be of a mesh material (e.g., stainless steel mesh) or of solid plate metal (e.g., stainless steel). Lower section 12 can be generally rectangular, providing side walls 14, 15 and end walls 16, 17. Each end wall 16, 17 can be provided with a handle. End wall 16 has a handle 23. End wall 17 has a handle 24. Each trough 21 and peak 22 is connected with an inclined panel 25. While multiple troughs 21 are shown, a single trough 21 could be provided on an elongated lower section 12 having a single row of openings 19 in an upper section 13 (as an alternate embodiment).

Figure 2:
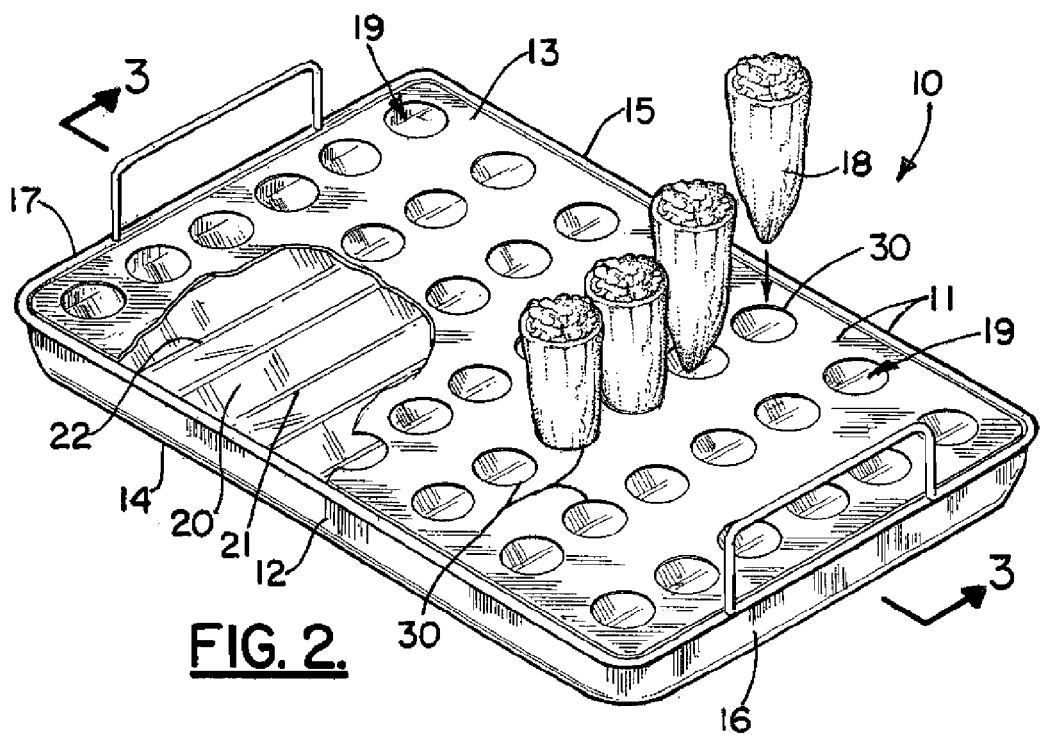
FIG. 2 is a partially cut away perspective view of a preferred embodiment of the present invention.
Figure 3:
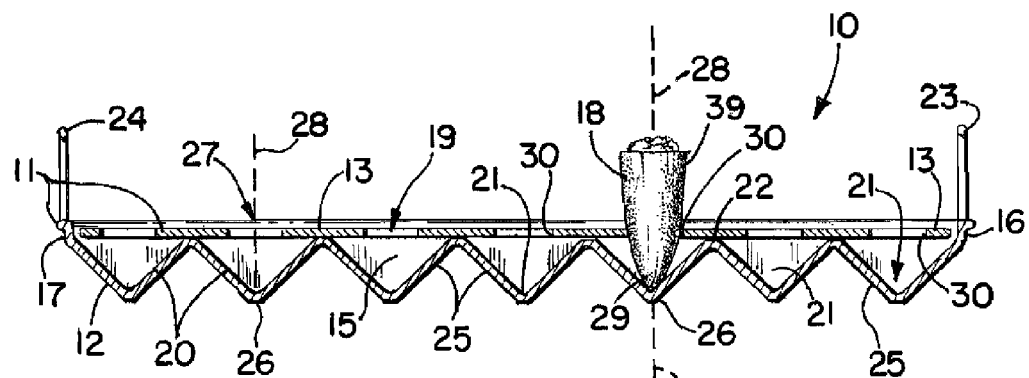
FIG. 3 is a sectional view taken along lines 3-3 of FIG. 2.
Figure 4:
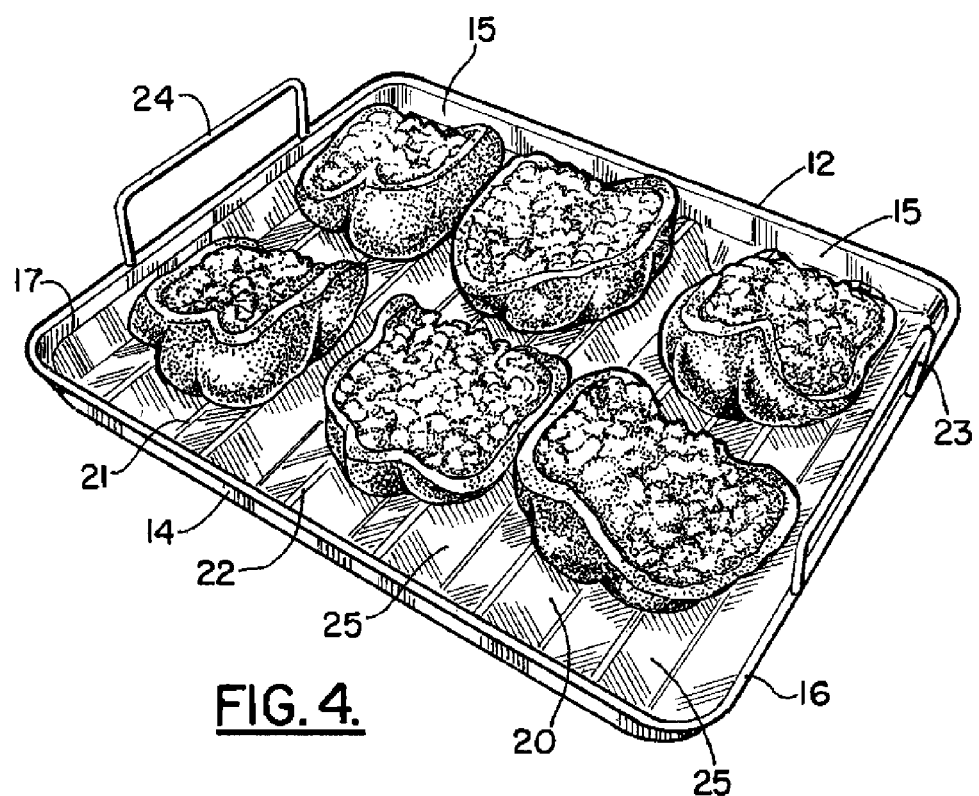
FIG. 4 is a perspective view of a preferred embodiment of the present invention showing the upper plate removed.

The upper section or plate 13 nests within the side walls 14-17 and rests upon the plurality of peaks 22 of corrugated bottom panel 20 (see FIGS. 1-3). The lower section 12 can be of welded metal construction including troughs 20 which can be formed of sections of angle members, flanged members or the like that are welded together. Alternatively, a single sheet of material can be corrugated to the shape of lower section 12 using a stamp or die.

Each trough 21 has a trough 21 lower end 26 that is centered upon the center 27 of an opening 19 as seen by referring to reference line 28 in FIG. 3. In this fashion, when an elongated food item (such as an elongated pepper 18) is placed in an opening 19, the lower end of the pepper 18 also registers in the V-shaped trough 20 and more particularly in the lower most portion 26 thereof (see FIG. 3).

When grilling stuffed elongated peppers (e.g., jalapeno), the upper section or plate 13 is placed upon the lower section 12 (see FIGS. 1-3). Notice in FIG. 3 that the center 27 of each opening 19 is vertically aligned with the lowest end 26 of a trough 21 as indicated by the dotted reference line 28 in FIG. 3. Lower end 29 of pepper 18 rests in lower end 26 of trough 21. Circular edge 30 that defines each opening 19 engages and supports pepper 18 in between its upper end 39 and lower end 29 as seen in FIGS. 2-3. Upper section or plate 13 is shown having an array of openings 19. In FIGS. 1-2, there are seven rows of openings 19, six openings 19 in each row. However, more or fewer rows can be provided. Each row can provide any selected number of openings 19.

Figure 5:
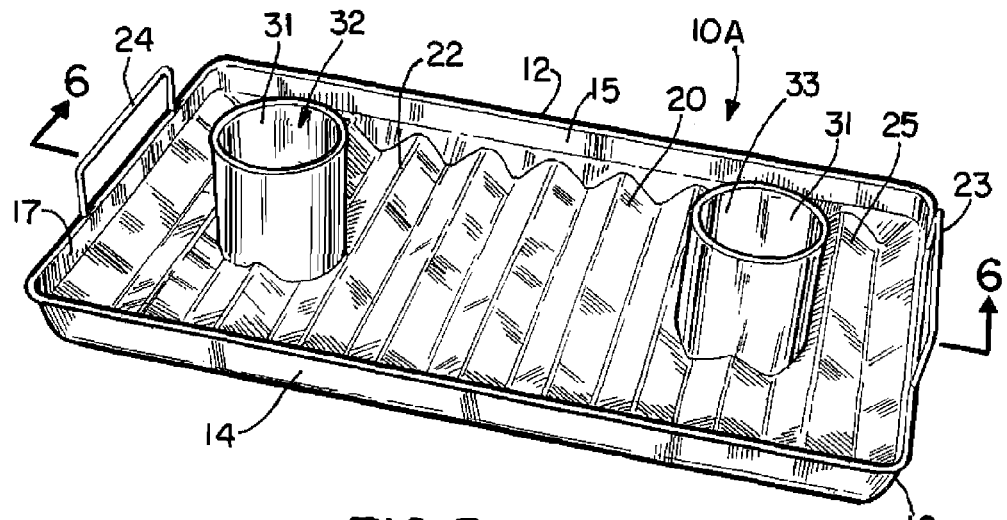
FIG. 5 is a perspective view of an alternate embodiment of the apparatus present invention.
Figure 6:
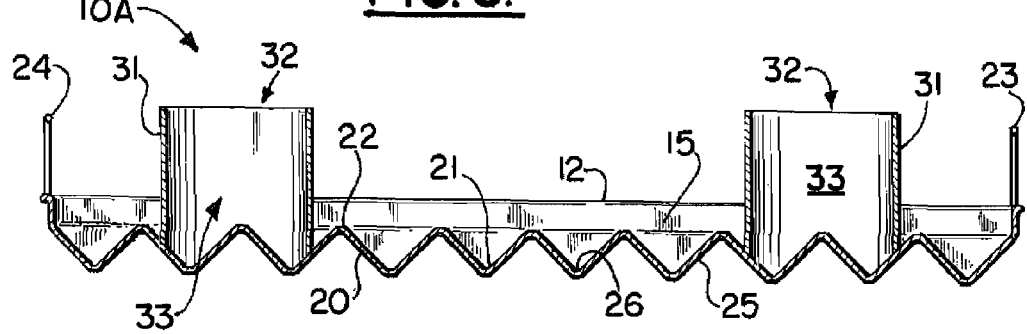
FIG. 6 is a sectional view taken along lines 6-6 of FIG. 5.
Figure 7:
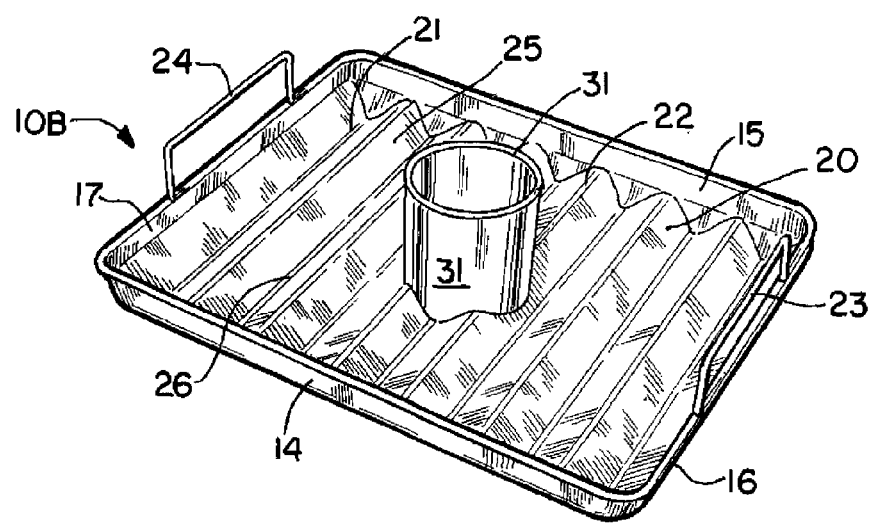
FIG. 7 is a perspective view of an alternate embodiment of the apparatus of the present invention.
Figure 8:
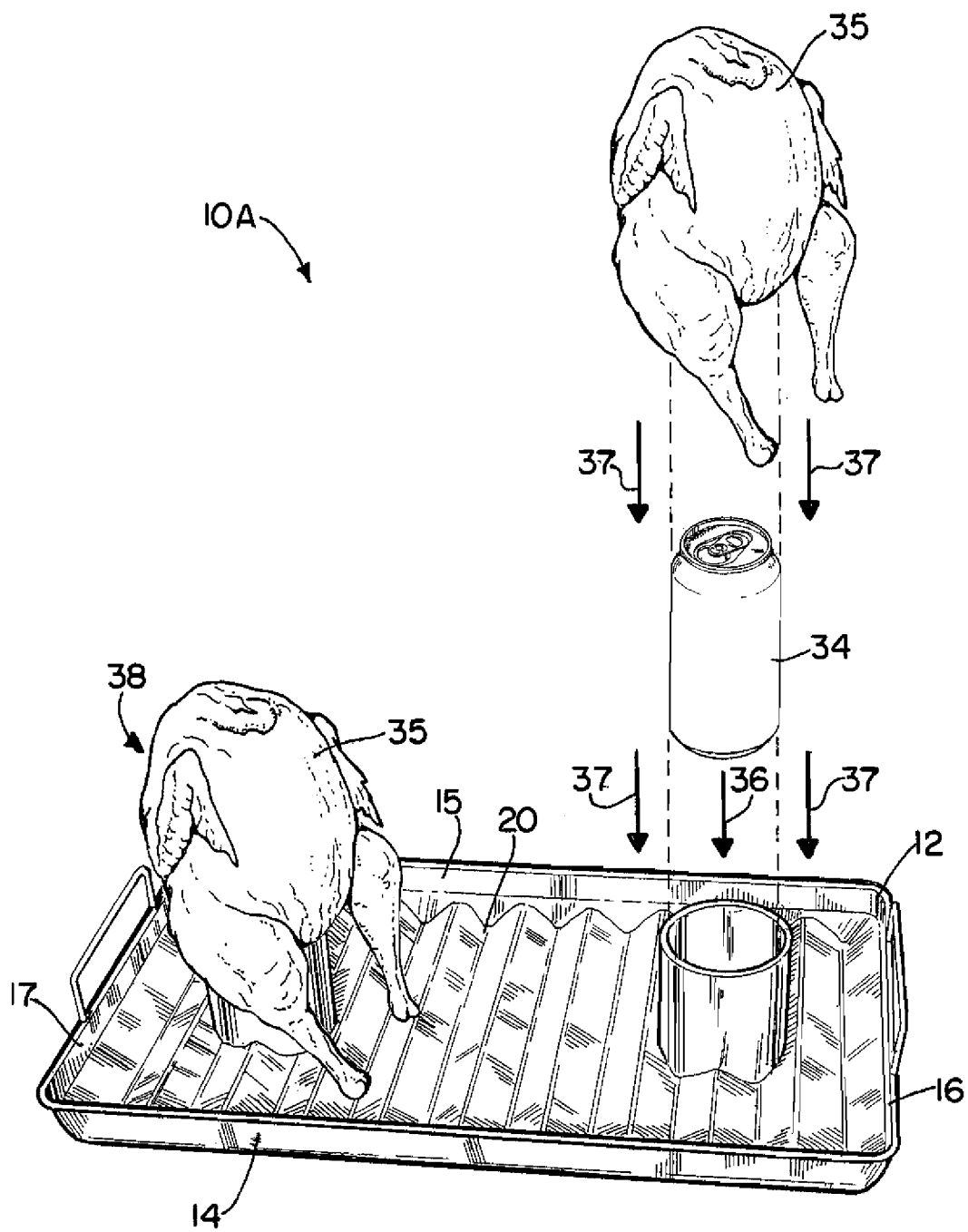
FIG. 8 is a perspective view of an alternate embodiment of the apparatus of the present invention.

In FIGS. 5-8, an alternate version of the grilling rack is designated by the numeral 10A in FIGS. 5-6 and 8 and numeral 10B in FIG. 7. For the racks 10A-10B, there is no upper section or plate 13. In FIGS. 5,6 and 8, an alternate embodiment is designated by the numeral 10A. In FIG. 7, the alternate embodiment is designated by the numeral 10B.

In FIGS. 5, 6, and 8, the rack 10A includes a pair of cylinders or cylindrically shaped members or receptacles 31. Each cylinder 31 has an open top 32 and an interior 33 for holding a vegetable or other food item or a container of seasoning such as an opened can 34 of any selected beverage. Rack 10B in FIG. 7 provides only cylinder 31. Each receptacle 31 is attached to corrugated bottom panel 20. Receptacle 31 can be placed anywhere on the rack 10A. Panel 20 can be a single sheet of corrugated material or a plurality of tapered or V-shaped members welded together. Corrugated panel 20 can have handles 23, 24 connected thereto (e.g., welded).

The present invention provides an improved grilling rack apparatus that enables a user to cook many food items including elongated peppers that have been stuffed with a filler or filling. For the embodiment of FIG. 4-8, food items 35 such as poultry can be supported upon (e.g. skewered) a cylinder 31 that contains flavoring (e.g. opened can 34 of any selected liquid or spices or vegetables). Arrow 36 in FIG. 8 illustrates placement of can 34 within interior 33 of cylinder 31 via open top 32. A food item 35 such as a chicken can be placed over (e.g. skewered) the combination of opened can 34 and cylinder 31 as indicated by arrows 37 in FIG. 8. Such final position of the food item (e.g., poultry carcass, chicken, etc.) is designated as 38 in FIG. 8 wherein the can 34 (or other spice or flavoring) occupies interior 33 of cylinder/receptacle 31 and the food item 35 is skewered over both cylinder 31 and the contained can 34 or spice or flavoring. Receptacle 31 can be placed anywhere on the rack 10B.

PARTS LIST

The following is a list of parts and materials suitable for use in the present invention:

| Parts Number | Description |
| --- | --- |
| 10 | grilling rack |
| 10A | grilling rack |
| 10B | grilling rack |
| 11 | frame |
| 12 | lower section |
| 13 | upper section |
| 14 | side wall |
| 15 | side wall |
| 16 | end wall |
| 17 | end wall |
| 18 | pepper |
| 19 | opening |
| 20 | corrugated bottom panel |
| 21 | trough |
| 22 | peak |
| 23 | handle |
| 24 | handle |
| 25 | inclined panel |
| 26 | lower end |
| 27 | center of opening |
| 28 | reference line |
| 29 | lower end |
| 30 | circular edge |
| 31 | cylinder/receptacle |
| 32 | open top |
| 33 | interior |
| 34 | can |
| 35 | food item |
| 36 | arrow |
| 37 | arrow |
| 38 | position |
| 39 | upper end |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A food grilling rack for grilling elongated pepper food items, comprising:
   a) a frame defined by a plurality of connected side walls;
   b) the frame including a lower corrugated sheet defined by alternating peaks and troughs, each trough having a lowest portion, said lower corrugated sheet being attached to at least one of the side walls;
   c) an upper sheet of material that is supported by the lower corrugated sheet;
   d) an array of openings in the upper sheet including a plurality of rows, each row having a plurality of openings, each opening having an opening perimeter and wherein the opening perimeter is projected downwardly and vertically aligns with the bottom of the trough, and wherein each said opening of the plurality of openings aligns with the lowest portion of the bottom of the trough; and
   e) each row of the plurality of rows of openings being located above a trough, there being a lateral distance between each pair of peaks of each trough, and wherein for each row of the plurality of rows of openings, only the openings of one row of the plurality of rows of openings is located in between the pair of peaks that the particular row of openings is located above; and
   f) wherein each of the plurality of openings of each row has a largest dimension, and this largest dimension is smaller than the lateral distance between the pair of peaks that the particular row of openings is located above, but sufficiently large so that an elongated pepper food item extending through one of the plurality of openings of the particular row is supported by both the opening the pepper food item extends through and the trough the particular row of openings is above.

2. The food grilling rack of claim 1, wherein the elongated pepper food item is substantially vertical.

3. The food grilling rack of claim 1 wherein the upper and lower sheets are spaced apart with a gap therebetween.

4. The food grilling rack of claim 1 wherein the lower sheet is of a mesh material.

5. The food grilling rack of claim 1 wherein the rows of openings are arranged along parallel lines.

6. The food grilling rack of claim 1 wherein the openings of the rows of openings form a matrix of parallel rows and parallel columns.

7. The food grilling rack of claim 1 wherein the lower sheet is of a solid metallic plate.

8. The food grilling rack of claim 1 wherein the corrugated sheet has crests and the upper sheet of material is supported by one or more of said crests.

9. The food grilling rack of claim 1 wherein the connected side walls of the frame form right angled corners.

10. The food grilling rack of claim 1 wherein there are at least three (3) of said troughs.

11. A food grilling rack for grilling elongated pepper food items, comprising:
    a) a frame defined by a plurality of connected side walls;
    b) the frame including a peripheral portion and a lower sheet that is corrugated and that provides multiple peaks and valleys, each valley having a lowest portion and the corrugated sheet having spaced apart peaks that are spaced apart a first distance;
    c) an upper sheet of material that is supported by the lower sheet;
    d) an array of openings in the upper sheet including a plurality of rows, each row having a plurality of openings, each opening having an opening perimeter and wherein the opening perimeter is projected downwardly and vertically aligns with the bottom of the valley, wherein each said opening of the plurality of openings aligns with the lowest portion of the bottom of the valley; and e) each row of the plurality of rows of openings being located above a valley, there being a lateral distance between each pair of peaks of each valley, and wherein for each row of the plurality of rows of openings, only the openings of one row of the plurality of rows of openings is located in between the pair of peaks that the particular row of openings is located above; and f) wherein each of the plurality of openings of each row has a largest dimension, and this largest dimension is smaller than the lateral distance between the pair of peaks that the particular row of openings is located above, but sufficiently large so that an elongated pepper food item extending through one of the plurality of openings of the particular row is supported by both the opening the pepper food item extends through and the valley the particular row of openings is above.

12. The food grilling rack of claim 11, wherein the elongated pepper food item is substantially vertical.

13. The food grilling rack of claim 11 wherein the upper and lower sheets are spaced apart with a gap therebetween.

14. The food grilling rack of claim 11 wherein the connected side walls of the frame form right angled corners.

15. The food grilling rack of claim 11 wherein there are at least three (3) of said valleys.

16. A food grilling rack for grilling elongated food items, comprising:

a) a pan defined by a plurality of connected side walls and a pan bottom wall;

b) the pan bottom wall being a lower corrugated sheet defined by alternating peaks and troughs, each trough having a lowest portion, said lower corrugated sheet being attached to at least one of the side walls;

c) an upper sheet of material that is supported by the lower corrugated sheet;

d) an array of openings in the upper sheet including a plurality of rows, each row having a plurality of openings, each opening having an opening perimeter and wherein the opening perimeter aligns with the bottom of the trough, wherein each said opening of the plurality of openings aligns with the lowest portion of the bottom of the trough; and e) each row of the plurality of rows of openings being located above a trough, there being a lateral distance between each pair of peaks of each trough, and wherein for each row of the plurality of rows of openings, only the openings of one row of the plurality of rows of openings is located in between the pair of peaks that the particular row of openings is located above; and f) wherein each of the plurality of openings of each row has a largest dimension, and this largest dimension is smaller than the lateral distance between the pair of peaks that the particular row of openings is located above, but sufficiently large so that an elongated pepper food item extending through one of the plurality of openings of the particular row is supported by both the opening the pepper food item extends through and the trough the particular row of openings is above.

17. The food grilling rack of claim 16, wherein the elongated pepper food item is substantially vertical.

18. The food grilling rack of claim 16, wherein the upper and lower sheets are spaced apart with a gap therebetween.

19. The food grilling rack of claim 16, wherein the connected side walls of the pan form right angled corners.

20. The food grilling rack of claim 16, wherein there are at least three (3) of said troughs.

* * * * *